United States Patent
Wodak

(10) Patent No.: US 7,837,145 B2
(45) Date of Patent: Nov. 23, 2010

(54) SEAT FASTENING DEVICE

(75) Inventor: Jochem Wodak, Schwäbisch Hall (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 720 days.

(21) Appl. No.: 11/405,008

(22) Filed: Apr. 17, 2006

(65) Prior Publication Data

US 2007/0018047 A1 Jan. 25, 2007

(30) Foreign Application Priority Data

Jul. 15, 2005 (DE) ........................ 10 2005 033 048

(51) Int. Cl.
*B46D 11/06* (2006.01)
(52) U.S. Cl. .................................. 244/118.6; 248/429
(58) Field of Classification Search ............. 244/118.5, 244/118.6, 122 R; 248/500, 503, 503.1, 248/509, 429; 410/101, 104, 105, 115; 403/329
See application file for complete search history.

(56) References Cited

U.S. PATENT DOCUMENTS

| 3,241,501 | A | * | 3/1966 | Watts ........................ 410/105 |
| 3,306,234 | A | * | 2/1967 | Hansen et al. ................ 410/55 |
| 3,620,171 | A | * | 11/1971 | Brenia et al. ................ 410/105 |
| 5,000,634 | A | * | 3/1991 | Ducote ........................ 410/77 |
| 5,433,550 | A | * | 7/1995 | Huber ........................ 403/348 |
| 5,489,172 | A | * | 2/1996 | Michler ....................... 410/105 |
| 5,520,357 | A | * | 5/1996 | Payne et al. ............... 244/118.1 |
| 5,762,296 | A | * | 6/1998 | Gilbert ..................... 244/118.1 |
| 5,791,502 | A | * | 8/1998 | Bietz et al. ................. 211/192 |
| 6,739,281 | B1 | * | 5/2004 | Grimes ........................ 114/364 |
| 7,370,832 | B2 | * | 5/2008 | Frantz et al. ............. 244/118.6 |
| 7,438,511 | B2 | * | 10/2008 | Legeay ........................ 410/105 |
| 2005/0211836 | A1 | * | 9/2005 | Frantz et al. ............. 244/118.6 |

FOREIGN PATENT DOCUMENTS

DE 103 41 624 4/2005

* cited by examiner

*Primary Examiner*—Timothy D Collins
*Assistant Examiner*—Brian M O'Hara
(74) *Attorney, Agent, or Firm*—Posz Law Group, PLC

(57) ABSTRACT

The invention relates to a seat fastening device, especially for fastening aircraft passenger seats to the cabin deck of an aircraft, which has at least one fastening rail (12) which is provided on its top facing the passenger seat with through openings (14) which have distances to one another in a definable grid and which are used for passage of catch parts (16) of a locking body (10), and for detachable fastening of the locking body (10) to the fastening rail (12) from a release position into a locking position the respective catch parts (16) can be inserted into the assignable through openings (14) and can be at least partially triggered by an actuating means. Because in the release position the respective catch parts (16) point in one direction and because in the locking position at least one of the catch parts (16) is pivoted by the actuating means (28) such that it extends under the parts (24) of the fastening rail (12), the existing devices and systems are further improved such that the mounting effort on site can be reduced and the advantages of the fastening device as claimed in the invention become apparent especially for frequent installation and modification measures.

19 Claims, 3 Drawing Sheets

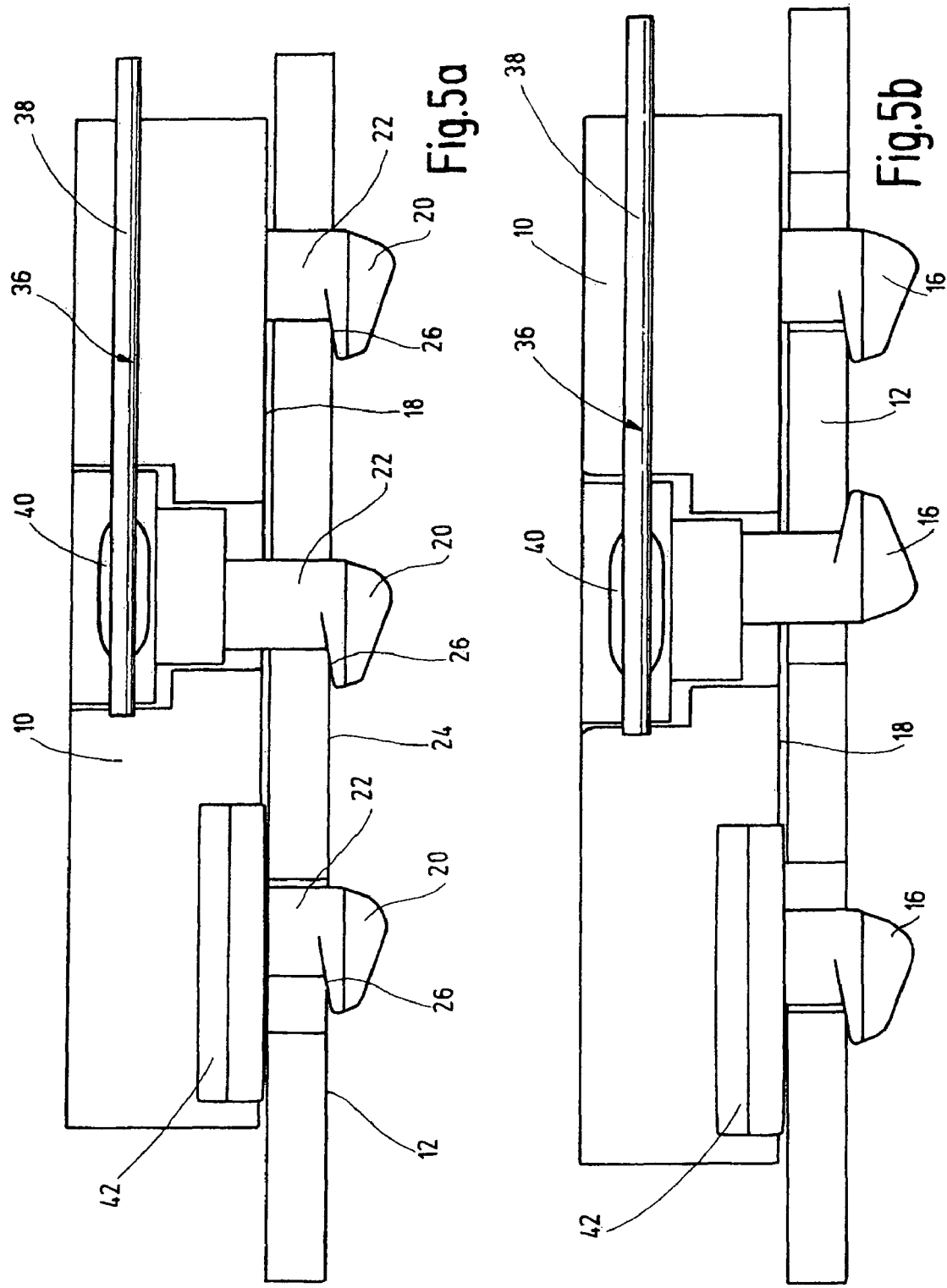

SEAT FASTENING DEVICE

The invention relates to a seat fastening device, especially for fastening aircraft passenger seats to the cabin deck of an aircraft, which has at least one fastening rail which is provided on its top facing the passenger seat with through openings which have distances to one another in a definable grid and which are used for passage of catch parts of a locking body, and for detachable fastening of the locking body to the fastening rail from a release position into a locking position the respective catch parts can be inserted into the assignable through openings and can be at least partially triggered by an actuating means.

These seat fastening devices and systems are used to configure aircraft passenger seats in a definable installation pattern with definable distances viewed in the longitudinal direction of the aircraft and in this way equip the aircraft cabin with seats. In this connection, several fastening rails in the deck of the cabin run in several rows next to one another in the longitudinal direction of the aircraft fuselage. Generally a passenger seat or a row of passenger seats located next to one another as a seat unit with its base feet is tightly connected to the fastening rails according to a definable seating pattern, in the longitudinal direction of the base feet two pairs of foot parts on two fastening rails which lie parallel next to one another being detachably fastened by means of so-called interlocking bodies. Furthermore, loads within the aircraft cabin can also be lashed down and fastened in this way with these seat fastening devices.

In the known designs, on seat fastening devices that are freely available on the market, a base body as an interlocking body has a mounting part for mounting on the fastening rail and on its top opposite the fastening rail, an attachment eye for fixing the fastening bolt of the respective base foot for the passenger seat. On its side facing the fastening rail the base body has catch parts with a disk-shaped cross section opposite in pairs in the longitudinal direction spaced apart from one another, which can be engaged to the through openings of the fastening rail in the longitudinal direction of the base body with a tight fit. In this way the base body with its catch parts can be partially inserted into the through openings and by moving the base body longitudinally relative to the fastened fastening rail by one grid spacing on the through openings the catch parts make contact with the free profile flanks of the hollow section-like fastening rail by extending underneath it. On the opposite side the known solution has a crosspiece-like widening on the base body, the pertinent widening being supported on the top of the profile flanks of the fastening rail and overlapping the through openings located between the two pairs of catch parts of the base body.

In the known solutions then the respective base body has a mounting part which is also called a "plunger" in technical language, which can be moved up and down by the fastening means of the base body transversely to its longitudinal movability, in the lowered position other catch parts of the mounting part exactly engaging the assignable through openings of the profile rail and in this way fastening the mounting part in its position on the fastening rail in the longitudinal direction, which part otherwise is protected against lifting vertically by the catch parts which extend under the free profile flanks of the fastening rail. By tightening the fastening means of the attachment means then on the one hand the other catch parts of the mounting part (plunger) are fixed in their position on the fastening rail and otherwise the remaining catch parts of the base body are braced against the profile flanks of the hollow section-like fastening rail, so that both in an axial and also in the radial direction the base body is reliably held on the fastening rail.

Proceeding from this prior art, the object of the invention is to further improve the known seat fastening devices and systems such that they can be economically implemented and installed easily and reliably. This object is achieved by a seat fastening device with the features of claim 1 in its entirety.

Because according to the characterizing part of claim 1 in the release position the respective catch parts point in one direction and because in the locking position at least one of the catch parts is pivoted by the actuating means such that it extends under the parts of the fastening rail, the existing devices and systems are further improved such that the mounting effort on site can be reduced and the advantages of the fastening device as claimed in the invention become apparent especially for frequent installation and modification measures. By way of a pivoting process which is manually easy to carry out via the actuating means, reliable mechanical locking between the locking body and the mounting rail can be induced, in this way a frictional connection between the locking body and the mounting rail being obtained.

With the seat fastening device as claimed in the invention a plurality of rail designs can be accommodated in which on the one hand the through openings are connected to one another by way of continuous longitudinal channels, or on the other hand the through openings without a further connection to one another extend in isolation through the fastening rail body. Since the seat fastening device as claimed in the invention can be fastened wherever the through openings are directly located and complex adjustment or displacement processes along the fastening rail are avoided, in this way reliable fastening especially of passenger seats on the cabin deck of the aircraft is possible in an installation-friendly manner. The seat fastening device as claimed in the invention requires few movable components. Thus it is small, and, due to the low diversity of parts, it can be economically produced. In this way weight can also be reduced.

In one preferred embodiment of the seat fastening device as claimed in the invention, the actuating means is formed from a pivoting pin which, rotationally guided in the locking body, has a catch part configured eccentrically on its one free end. Since the pertinent cam drive for the locking body assumes a clearly recognizable position both in its released and also in its locked position, thereupon a plausibility check can be quickly done optically whether the seat is fastened or no. This feature benefits the requirements for increased safety.

In another especially preferred embodiment of the seat fastening device as claimed in the invention it is provided that in the release position all catch parts point in the same direction and in the locking position the catch part which can be triggered by the actuating means assumes a position opposite the other catch parts. Accordingly the locking body is first mounted on the fastening rail and the catch part which for the time being is in the release position is moved into the locking position by the actuating means, relative hereto the other rigid catch parts of the locking body moving opposite in the longitudinal direction of the rail and crossing it in this way for interlocking underneath.

In another preferred embodiment of the seat fastening device as claimed in the invention, it is provided that the actuating means can be kept in defined actuating settings by means of a spring storage device. The indicated spring storage device provides for the actuating means to move into defined positions and to be locked there, the lock being releasable with a definable actuating force.

Preferably it is furthermore provided that at least in the area of one of the catch parts there is an energy storage device which in the locked state of the locking body on the fastening rail enables damping (anti-rattle). Based on this configuration, vibrations and impacts in flight can be reliably accommodated and the seat structure relieved.

Other advantageous embodiments of the solution as claimed in the invention are the subject matter of the dependent claims.

The seat fastening device as claimed in the invention is explained in greater detail with reference to one exemplary embodiment as shown in the drawings. The figures are schematic and are not drawn to scale, in which FIG. 1 show in a perspective view the locking body of the fastening device;

FIG. 5a, 5b shows a simplified schematic side view of one part of the locking body with the fastening rail in the release position and in the locking position;

The seat fastening device as claimed in the invention is used especially to fasten aircraft passenger seats (not shown) on the cabin deck of an aircraft. Optionally this fastening device can also be used in other areas, for example in the area of vehicles such as coaches, ferries or the like; but it can also be used within the framework of hall seating, for example for a meeting hall, a theater, or the like. Furthermore the seat fastening device can also be used for lashing down cargo, baggage or other shipments carried by aircraft or vehicles of any type.

Figure 3:
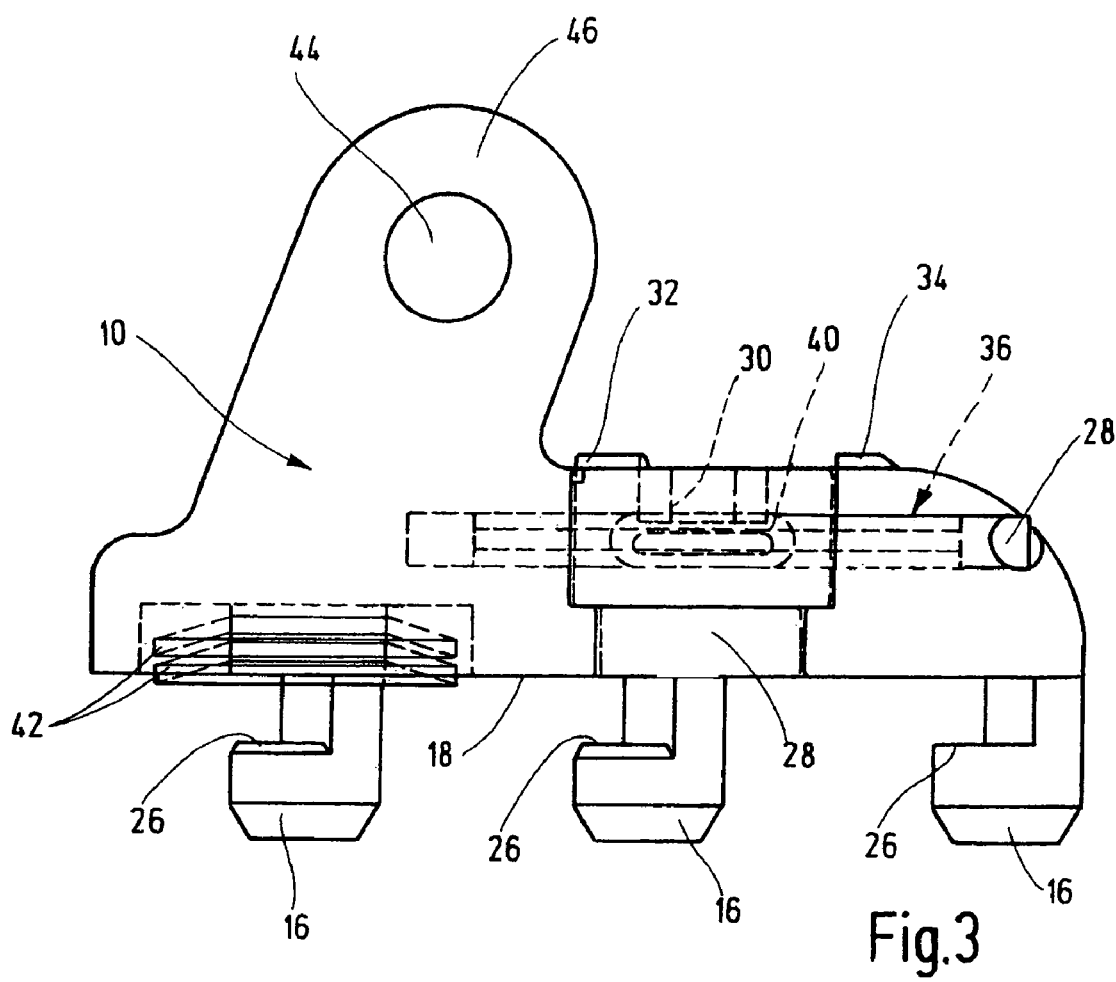
FIG. 3 shows partially in a section, partially in a front view a side representation of the locking body as shown in FIG. 1 with the actuating means inserted as shown in FIG. 2.
Figure 4:
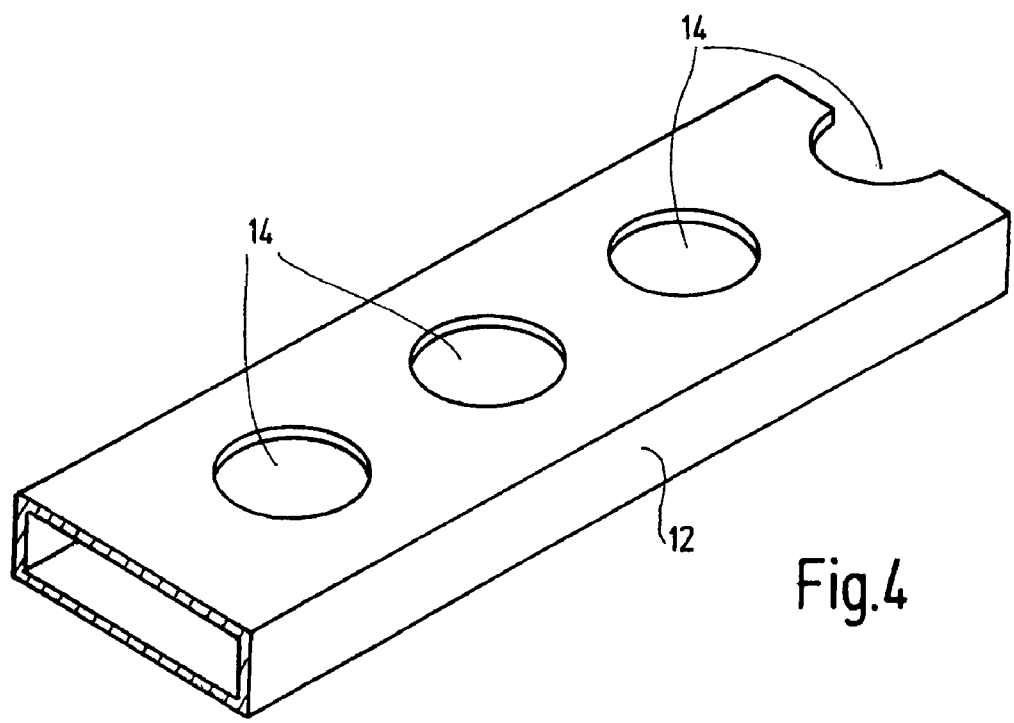
FIG. 4 shows an extract of a fastening rail made as a hollow section.

The seat fastening device has a locking body designated as a whole as 10 (compare FIG. 3) which interacts with the fastening rail 12 as is shown in FIG. 4 in sections and by way of example. The fastening rail 12 shown in FIG. 4 is provided on its top which faces the passenger seat which is not shown with through openings 14 which for example have a circularly cylindrical cross section; but they can also be made differently in cross section. The through openings 14 have distances to one another in a definable grid spacing; in this embodiment the distance between the through openings 14 will be roughly 1 inch. The fastening rail 12 is extruded in the manner of a hollow section for example from aluminum material; here however other versions are also conceivable, such as for example a C-section or a flat longitudinal section which is integrated directly in the cabin deck and borders it flat relative to the vicinity, and then underneath the flat fastening rail (not shown) there can be a channel in the cabin deck. The indicated through openings 14 are used for passage of catch parts 16, of which three project underneath the bottom 18 of the locking body 10, which body is made flat. Accordingly the cross section of a catch part 16 is dimensioned such that it can be inserted from overhead into the assignable through opening 14, FIGS. 3 and 5a showing the so-called release position of the locking body 10 in which it can be mounted on the top of the fastening rail 12 and the catch parts 16 engage the through openings 14 unhindered.

The indicated catch parts 16 are made as locking hooks and the free hook part 20 is connected to an essentially cylindrical interlocking pin 22 with a clearance height somewhat greater than the clearance height of the fastening rail 12 in the area of the through openings 14. In order to be able to achieve good interlocking of the respective catch part 16 with the bottom 24 of the fastening rail 12, each catch part 16 in towards its free end has a descending bevel 26 which, as shown in FIG. 5b, in the locking state establishes a frictional connection between the locking body and the fastening rail 12. The catch part 16 which is the middle one in the direction of looking at FIG. 3, eccentrically offset to the middle axis of the actuating means, is integrally coupled to a cylindrical pivoting pin 28 which with the formation of an offset to the outside toward the vicinity is slightly widened in diameter and accessibly from overhead has an engagement point 30 of an actuating tool, for example in the form of a hexagonal head socket wrench. This pivoting pin 28 with the engagement point 30 in this respect forms the actuating means for the middle catch part 16.

Figure 2:
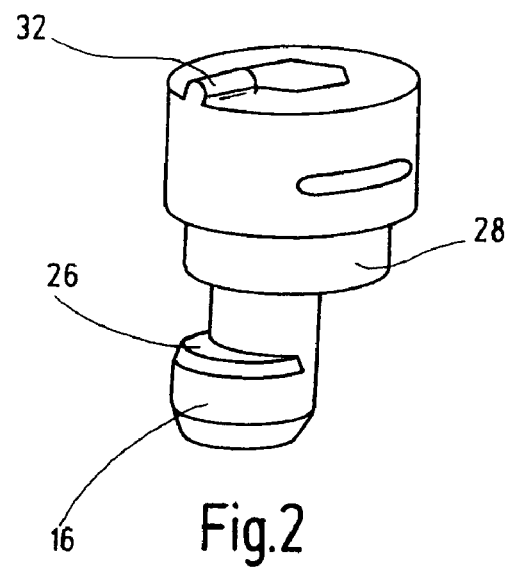
FIG. 2 shows in a perspective view the actuating means with a pivotable catch part.

If the locking body 10 according to its base position as shown in FIG. 3 with its catch parts 16 is inserted into the assignable through openings 14 in the fastening rail 12, the released state as shown in FIG. 5a results, in which the individual bevels 26 run out underneath the bottom 24 of the fastening rail 12. If at this point the pivoting pin 28 is pivoted by 180° for example by means of a hexagonal head socket wrench, the eccentrically mounted interlocking pin 22 of the middle catch part 16 viewed in the direction of looking at FIG. 5a shifts the locking body to the left until the two edge-side catch parts 16 of the locking body 10 are engaged by interlocking with the fastening rail 12. As shown in FIG. 2, the actuating means 28 on its top has a mark 32 which as shown in FIG. 3 in the released position is facing away from another mark 34 which on the top of the locking body 10 is a component thereof. If for locking purposes the pivoting pin 28 is turned 180° to its longitudinal axis, the two marks 32, 34 assume a bordering congruent position; this indicates directly that the locking position as shown in FIG. 5b prevails. In the released position therefore the respective catch parts 16 point in one direction and in the locking position the middle catch part 16 is pivoted by the actuating means 28 such that it extends under the bottom 24 of the fastening rail 12 with flat contact. The indicated bevels 26, as shown in FIG. 3, can be made differently in terms of how the bevel runs, in order in this way to achieve uniform engagement with the fastening rail 12 over the entire length of the locking body 10 in the locking position in the manner of an extended thread.

Figure 6:
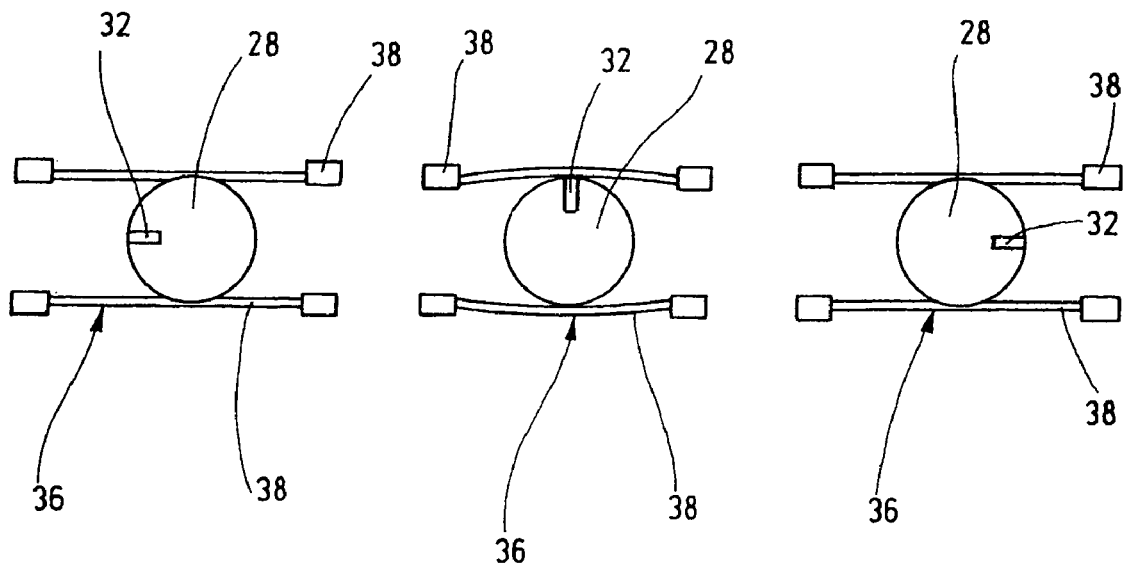
FIG. 6 shows in various representations the actuating means with a locking spring storage device in the form of two adjacently opposite spring wire parts.

As is further apparent from FIG. 6, the actuating means 28 can be kept in defined actuating positions by means of a spring storage device designated as a whole as 36. Here the spring storage device 36 consists essentially of two rod-shaped spring wire parts 38 which each thicken in cross section on their free end in order to be reliably held in this way on the end side in the interior of the locking body 10; for the sake of simpler illustration, this configuration is not shown in FIGS. 5a and 5b. Furthermore, for the sake of simpler representation in FIG. 6, the engagement point 30 for the pivoting pin 28 is omitted and only the mark 32 shows the individual rotary positions for the actuating means.

Viewed in the direction of looking at FIG. 6, at extreme left the release position is shown and the two spring wire parts 38 engage two opposing engagement recesses 40 on the actuating means 28, their intersecting at the same height opposite on the outer periphery of the pivoting pin 28. If at this point the pivoting pin 28 is turned clockwise by 90° into the middle representation as shown in FIG. 6, the spring wire parts 38 move out of the engagement recesses 40 and expand spring-elastically, held apart from one another by the cylindrical outer periphery of the pivoting pin 28. Continuing to turn clockwise and moreover with complete rotation of 180° out of the release position, as shown at extreme right in FIG. 6, the mark 32 points likewise to the right and the two spring wire parts 38 each in turn re-engage the engagement recess 40 which was opposite previously and are therefore in the locking position as shown in FIG. 5b.

The left catch part 16 shown in FIG. 3 is surrounded where its upper foot runs out to the locking body 10 by a disk spring assembly 42 which is held stationary in a hollow cylindrical recess in the locking body 10 on its bottom and projects with a definable excess length over the bottom 18 of the locking body 10, and in this way in the locking state of the fastening device can be supported on the top of the fastening rail 12. In this respect the disk spring assembly 42 forms an energy storage device which enables damping (so-called anti-rattle function) in the locked state of the locking body 10 on the fastening rail 12. In this way vibrations and impacts can be diverted into the seat structure without failure via the fastening rail 12.

Figure 1:
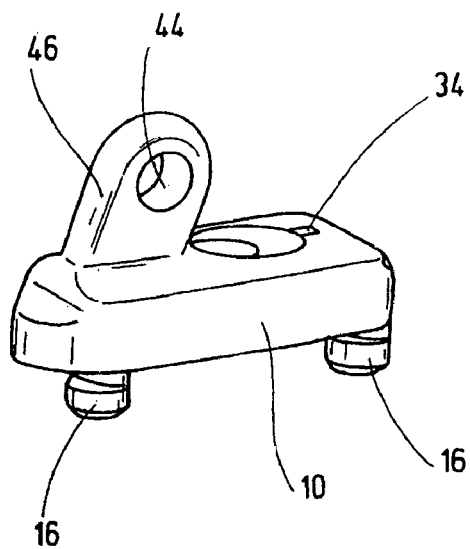

As FIGS. 1 and 3 in particular show, the locking body 10 on its top opposite the catch parts 16 has an attachment eye 44 which, held in a bevelled receiver 46, with definable horizontal spacing is located more closely on the rigid catch part 16, then on the following, movable catch part 16 in the middle of the two rigid catch parts 16. This attachment eye 44 is used for passage of a fastening pin which is not detailed for attaching the seat structure to the aforementioned cabin deck. For the sake of simpler illustration both the beveled receiver and also the attachment eye are omitted in FIGS. 5a, 5b.

The configuration of the beveled receiver 46 with the attachment eye 44 is chosen such that in the locking position as shown in FIG. 5b all catch parts 16 contribute at the same time to the locking body 10 and furthermore the fastening device not being able to lift off the fastening rail 12. Furthermore, viewed in the direction of looking at FIG. 5b the entire left and the entire right catch part 16 block forward motion in the horizontal direction and the middle pivotable catch part 16 prevents opposite backward motion, likewise in the horizontal direction. Thus secure attachment is achieved by this fastening in all relevant axes.

The seat fastening device as claimed in the invention is made in the manner of a quick connection system which can accommodate a plurality of versions of rail systems, even those which are provided with longitudinal profile recesses between the through openings 14. For reasons of cost and practicability however there should be one fastening rail 12 as shown in FIG. 4 which completely omits these longitudinal recesses and in contrast to known designs, the seat fastening device as claimed in the invention can be used especially for the pertinent seat rail systems.

The invention claimed is:

1. A seat fastening device, especially for fastening aircraft passenger seats to the cabin deck of an aircraft comprising:
   a locking body having catch parts;
   a fastening rail, an upper face of which faces a passenger seat, wherein the fastening rail includes a wall through which a plurality of through openings is formed, and the through openings of the plurality of through openings are spaced apart from one another in a definable grid and are used for passage of the catch parts of the locking body, and the fastening rail is a hollow rail; and
   actuating means for triggering at least one of the catch parts of the locking body;
   wherein
   for detachable fastening of the locking body to the fastening rail from a release position into a locking position, each of the catch parts of the locking body is inserted into a distinct through opening of the plurality of through openings at a time, without any interconnection extending through the wall of the fastening rail between any two through openings of the plurality of through openings into which the catch parts of the locking body are inserted,
   in the release position all of the catch parts of the locking body point in one direction,
   in the locking position, at least one of the catch parts of the locking body is pivoted by the actuating means relative to the other catch parts of the locking body such that the at least one catch part of the locking body engages a lower surface of the wall of the fastening rail.

2. The seat fastening device as claimed in claim 1, wherein the actuating means is formed by a pivoting pin, which is rotationally guided in the locking body, and wherein the at least one catch part, which is pivoted by the actuating means while received within one of the through holes, is configured eccentrically on a free end of the pivoting pin.

3. The seat fastening device as claimed in claim 1, wherein in the release position, all catch parts point in the same direction, and in the locking position, the catch part that can be triggered by the actuating means assumes a position opposite the other catch parts.

4. The seat fastening device as claimed in claim 1, wherein the at least one catch part that can be triggered by the actuating means is located between two catch parts that are provided rigidly on the locking body.

5. The seat fastening device as claimed in claim 1, wherein the catch parts are formed from holding parts projecting on the bottom of the locking body, and wherein a bottom surface of the locking body is flat for making surface-to-surface contact with the fastening rail.

6. The seat fastening device as claimed in claim 1, wherein the actuating means can be held in defined actuation settings by a spring storage device.

7. The seat fastening device as claimed in claim 6, wherein the spring storage device is formed from two spring wire parts, which can be caused to engage at least two opposing engagement recesses on the actuating means.

8. The seat fastening device as claimed in claim 1, wherein, at least in the area of one of the catch parts, there is an energy storage device that enables damping in the locked state of the locking body on the fastening rail.

9. The seat fastening device as claimed in claim 1, wherein the locking body on its top, opposite the catch parts, is provided with an attachment eye, which is held in a beveled receiver, and wherein the beveled receiver is located more closely to a rigid catch part than to the at least one of the catch parts that is pivoted by the actuating means.

10. The seat fastening device as claimed in claim 1, wherein the catch parts are locking hooks.

11. The seat fastening device as claimed in claim 1, wherein the catch parts have a free hook part, which is connected to an essentially cylindrical interlocking pin.

12. The seat fastening device as claimed in claim 1, wherein the catch parts have a free end and a bevel descending towards the free end, and wherein the descending bevel establishes a frictional connection between the locking body and the fastening rail in the locking position.

13. The seat fastening device as claimed in claim 2, wherein the catch part, which is pivoted by the actuating means, is integrally coupled to the pivoting pin.

14. The seat fastening device as claimed in claim 1, wherein the actuating means is accessible from above the actuating means and has an engagement point for engaging an actuating tool.

15. The seat fastening device as claimed in claim 2, wherein the catch part, which is pivoted by the actuating means, is formed by an interlocking pin, which is an eccentric part of the pivoting pin, and if the pivoting pin is pivoted from the release position into the locking position, the eccentrically mounted interlocking pin shifts the locking body until the other catch parts of the locking body are engaged by interlocking with the fastening rail.

16. The seat fastening device as claimed in claim 2, wherein the pivoting pin has a pivot axis which is perpendicular to the wall.

17. The seat fastening device as claimed in claim 1, wherein the actuating means includes a pivoting pin, which is rotated in the locking body about a pivot axis, and wherein the at least one catch part has a vertically extending interlocking pin, which extends through the locking rail when the locking body is fastened to the locking rail, and the interlocking pin is eccentrically fixed to the pivoting pin such that the interlocking pin has a longitudinal axis that is parallel to and offset from the pivot axis.

18. A seat fastening device for fastening an aircraft passenger seat to the cabin deck of an aircraft comprising:

a locking body having a plurality of catch parts;

a fastening rail, which has a wall through which a plurality of through openings are is formed, and the through openings of the plurality of through openings are spaced apart from one another in a definable rid and are used for passage of the plurality of catch parts of the locking body, and the fastening rail is a hollow rail; and a pivot mechanism for permitting at least one catch part of the plurality of catch parts of the locking body to pivot about a pivot axis, wherein an upper surface of the wall faces the passenger seat and a lower surface of the wall faces the cabin deck, in a release position of the locking body, the plurality of catch parts of the locking body project in a first direction, and the locking body can be separated from the fastening rail by removing the plurality of catch parts of the locking body from the through openings of the plurality of through openings, and the locking body can be engaged with the fastening rail by inserting each of the catch parts of the plurality of catch parts of the locking body into a distinct through opening of the plurality of through openings at a time, without any interconnection extending through the wall of the fastening rail between any two through openings of the plurality of through openings into which the catch parts of the plurality of catch parts of the locking body are inserted, and in a locking position of the locking body, the at least one catch part of the plurality of catch parts of the locking body is pivoted by the pivot mechanism relative to the locking body such that it projects in a second direction, which is different from the first direction, and engages the lower surface of the wall to lock the locking body to the fastening rail.

19. The seat fastening device as claimed in claim 18, wherein the pivot mechanism includes a pivoting pin, which is rotated in the locking body about the pivot axis, and wherein the at least one catch part has a vertically extending interlocking pin, which extends through one of the through openings when the locking body is fastened to the locking rail, and wherein the at least one catch part is eccentrically fixed to the pivoting pin such that the interlocking pin has a longitudinal axis that is parallel to and offset from the pivot axis.

* * * * *